J. HABRIE.
TRANSMISSION MECHANISM.
APPLICATION FILED DEC. 7, 1921.
1,411,345.
Patented Apr. 4, 1922.
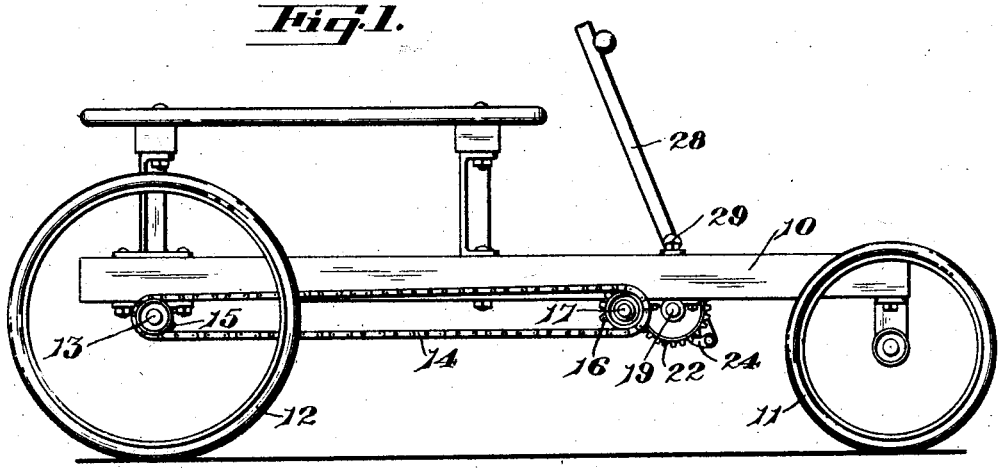
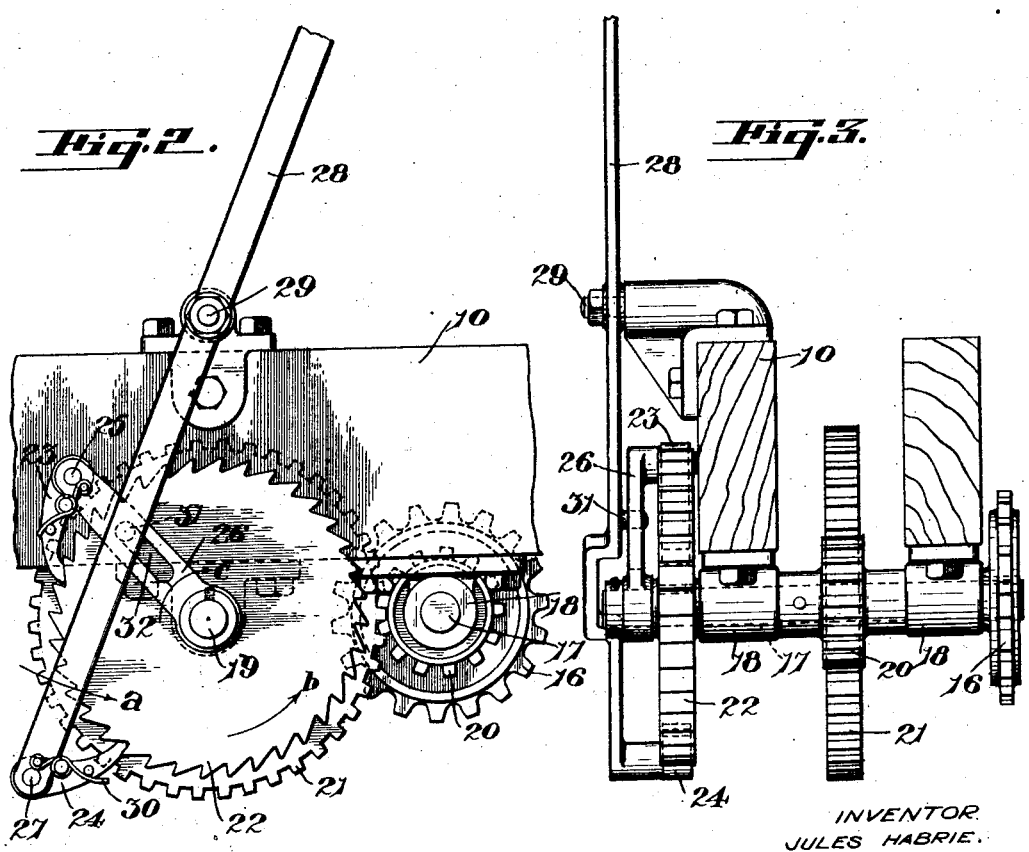
INVENTOR
JULES HABRIE.
BY Chas. E. Townsend
ATTORNEY.

UNITED STATES PATENT OFFICE.

JULES HABRIE, OF CLARKSBURG, CALIFORNIA.

TRANSMISSION MECHANISM.

1,411,345. Specification of Letters Patent. Patented Apr. 4, 1922.

Application filed December 7, 1921. Serial No. 520,461.

*To all whom it may concern:*

Be it known that I, JULES HABRIE, a citizen of the United States, residing at Clarksburg, in the county of Yolo and State of California, have invented new and useful Improvements in Transmission Mechanism, of which the following is a specification.

This invention relates to a power transmission mechanism, and particularly pertains to propulsion means for vehicles.

It is the principal object of the present invention to provide manually operated propulsion means for vehicles especially adapted for use with child's vehicles, and which mechanism is simple in its construction and affords means which may be easily operated to impart motion to the running gear of the vehicle, said structure also being designed to permit the vehicle to coast without influencing the propulsion means.

The present invention contemplates the use of a ratchet wheel which may be rotated in a single direction by the alternate operation of a compound lever mechanism actuated by an oscillating hand lever.

The invention is illustrated by way of example in the accompanying drawings, in which:

Fig. 1 is a view in side elevation showing a child's vehicle equipped with the present invention.

Fig. 2 is an enlarged fragmentary view in side elevation showing the propulsion means.

Fig. 3 is an enlarged view in transverse section and elevation through the propulsion means as shown in Fig. 2.

Referring more particularly to the drawing, 10 indicates the bed frame of a vehicle supported upon a running gear comprising front wheels 11 and rear wheels 12. It will be understood that the front wheels are carried by a pivoted axle by which the course of the vehicle may be determined. The rear wheels are mounted for rotation upon an axle 13, said wheels being driven through suitable power transmission means such as a sprocket chain 14. This chain passes around a sprocket 15 operatively connected with the rear axle or its wheels 12. The chain also passes around a front sprocket 16 carried by a jack shaft 17. This shaft is supported from the bed frame by bearings 18 and is suitably driven from a counter shaft 19 through spur gears 20 and 21. The counter shaft is carried by the bed frame and is keyed to the gear 21 as well as to a sprocket wheel 22. The sprocket wheel 22 is adapted to be engaged by operating pawls 23 and 24. The pawl 23 is pivoted upon a pin 25 carried at the outer end of a swinging arm 26. This arm is freely mounted upon the end of the counter shaft 19. The pawl 24 is pivoted by a pin 27 to the end of an operating lever 28. The lever 28 is pivoted at 29 to the bed frame of the vehicle.

Suitable means are provided to yieldably hold the engaging points of the pawl against the toothed circumference of the ratchet wheel, as for example by the tension springs 30. Movement is imparted from the operating lever 28 to the swinging lever 26 through a pin 31 carried by the lever 28 and engaging a longitudinally extending slot 32 formed in the swinging lever 26.

In operation of the present invention the vehicle is driven by alternately swinging the operating lever 28. When the lower end of the lever swings in the direction indicated by the arrow —a— in Fig. 2, the pawl 24 will engage one of the ratchet teeth of the ratchet wheel 22 and will cause this wheel to rotate in the direction of the arrow —b—. Motion will thus be imparted through the gear 21 to the gear 20 and the jack shaft 17. The sprockets and sprocket chain will thus be driven. During this movement the pin 31 will swing the lever 26 in the opposite direction as indicated by the arrow —c—, thus causing the pawl 23 to ride over the teeth of the ratchet. When the stroke of the operating lever 28 in the direction of the arrow —a— has been completed the lever is then swung in a counter direction to the arrow —a— and the pin 31 will move along the slot 32 to swing the lever 26 downwardly in a counter direction to that indicated by the arrow —c—. During this downward swinging movement the pawl 23 will be in engagement with one of the teeth of the ratchet wheel 22 and will continue the rotation of this wheel in the direction of the arrow —b—. Continued alternate reciprocation of the operating lever 28 will thus produce a succession of actions of the ratchet wheel 22 by the pawls 23 and 24, and will therefore continuously propel the vehicle. It will be evident that when the vehicle has assumed a greater speed than that imparted through the propulsion mechanism, the teeth of the ratchet wheel will ride beneath the ends of the pawl members 23 and 24 and will in fact permit the operating lever to stand still if desired without influencing it.

It will thus be seen that the device here disclosed provides a simple propulsion means for a child's vehicle particularly insuring that a suitable leverage will be imparted from the operating lever to the ratchet wheel whereby the vehicle may be propelled by a minimum effort.

While I have shown the preferred form of my invention as now known to me, it will be understood that various changes might be made in the combination, construction and arrangement of parts, without departing from the spirit of the invention as claimed, and it will be evident that the device might be readily adapted for use as a self-starter for automobiles and other purposes where a shaft is to be rotated.

Having thus described my invention, what I claim and desire to secure by Letters Patent is:

1. A mechanical movement comprising a rotatable ratchet wheel, an oscillating arm swinging over the plane face of said wheel, a pawl carried at one end of said arm for engaging the teeth of said wheel, a lever arm swinging from the axis of the wheel, a pawl at the outer end thereof for engaging the teeth of the wheel, and an operative connection between the said lever arms for alternately causing them to impart rotation to the ratchet wheel in a single direction.

2. A device of the character described comprising a shaft, a ratchet wheel carried thereby, an operating lever pivoted at a point exterior of the wheel and adapted to swing over the face thereof, a yieldable pawl carried at the lower end of said lever for engaging the teeth of said wheel, a second yieldable pawl adapted to engage the teeth of the lever, and means supporting said pawl and engaging the said lever whereby alternate engagement of the ratchet wheel by the pawls may be brought about while producing continuous rotation of the wheel.

3. A vehicle propulsion means comprising a counter shaft, a ratchet wheel keyed thereto, a swinging lever pivoted at the end thereof, a pawl carried by said lever to yieldably engage the ratchet teeth of said wheel, an elongated operating lever having one end adapted to swing across the face of said ratchet wheel, a pawl carried at the end of said portion of the lever to yieldably engage the teeth of the ratchet wheel, and means operatively connecting the swinging lever and the operating lever whereby movement of the operating lever in one direction will cause the swinging lever to move in the opposite direction and will alternately cause the pawls to rotate the ratchet wheel in a single direction.

JULES HABRIE.